UNITED STATES PATENT OFFICE.

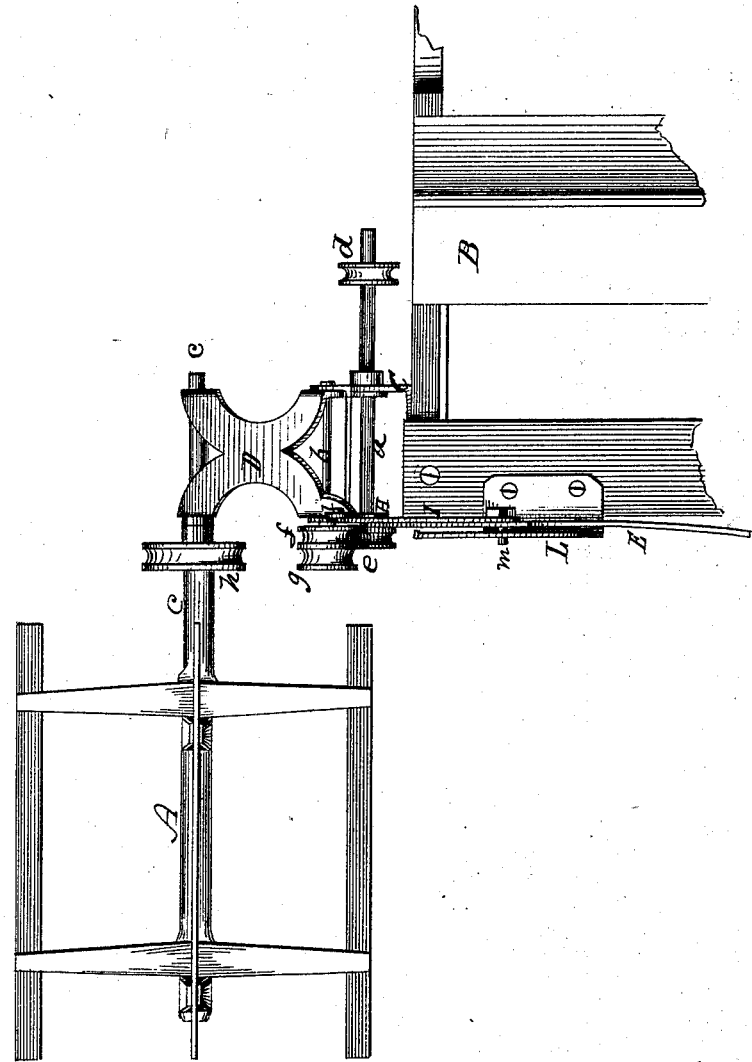

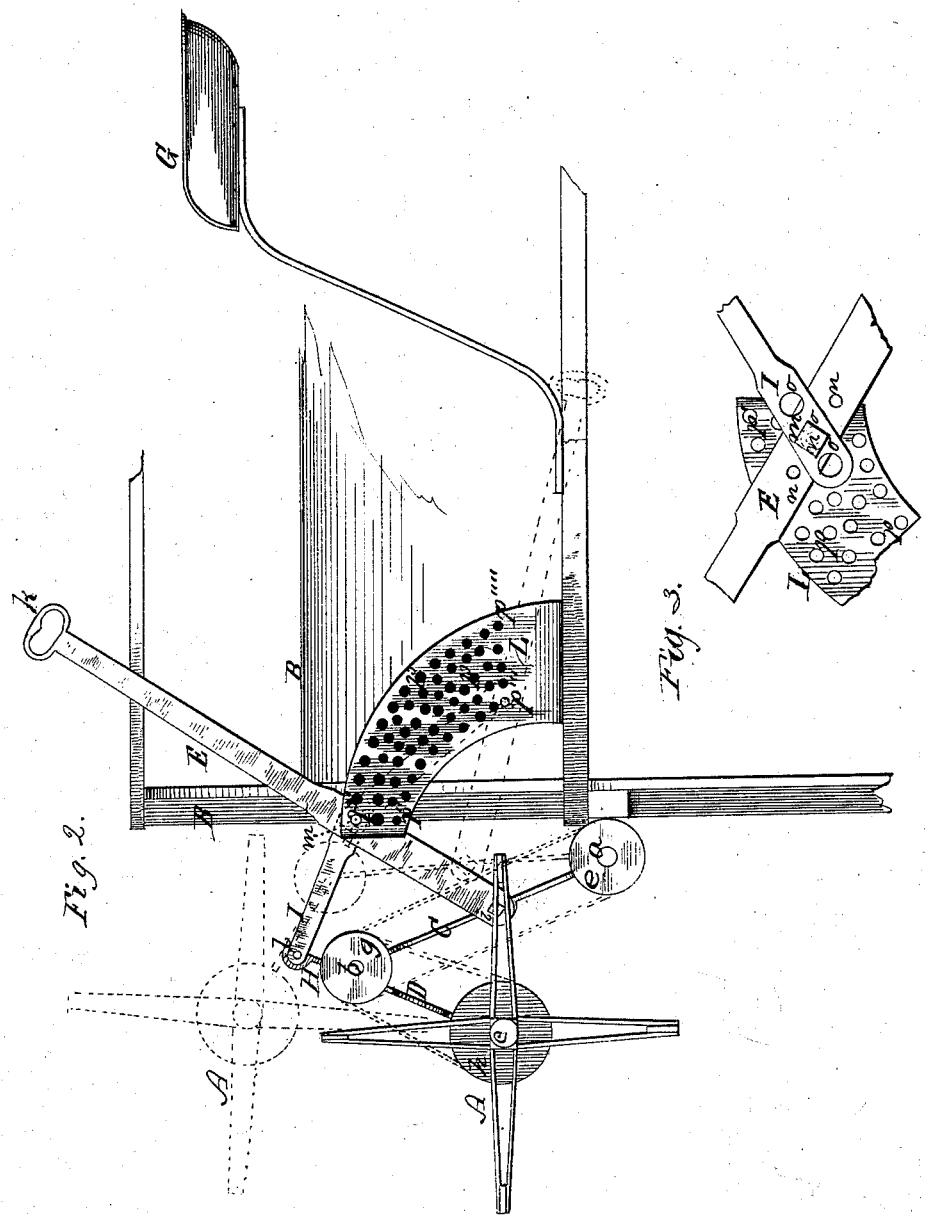

JOHN F. APPLEBY, OF BELOIT, WISCONSIN.

IMPROVEMENT IN HARVESTER-REELS.

Specification forming part of Letters Patent No. 216,253, dated June 10, 1879; application filed November 2, 1877.

*To all whom it may concern:*

Be it known that I, JOHN F. APPLEBY, of Beloit, in the county of Rock and State of Wisconsin, have invented an Improved Device for Adjusting the Reels of Harvesters and Reapers; and I do hereby declare that the following is a full and exact description thereof, reference being had to the accompanying drawings, making part of this specification.

Figure 1 is a top view of a harvester-reel and my improved adjusting device as applied to a harvester-frame; Fig. 2, a side view of the same, showing two positions of the reel adjusted by my improved method; Fig. 3, view of a part detached.

Like letters designate corresponding parts in all of the figures.

In the drawings, A represents a harvester-reel, and B a portion of the harvester-frame on which the reel is mounted.

My improved device for adjusting the reel is constructed substantially as follows: The reel is mounted on a doubly hinged or jointed support, C D, the lower arm, C, being hinged or jointed to the frame B on a pivot or shaft, $a$, and the upper arm, D, being hinged or jointed to the upper end of the lower arm, C, by a pivot or shaft, $b$. The shaft $c$ of the reel has its bearings in the upper or extreme end of the upper arm, D. The pulleys $d$, $e$, $f$, $g$, and $h$, for communicating the motion to the reel, are arranged on their shafts $a\ b\ c$, as shown, being connected by belts or chains, as shown by dotted lines in Fig. 2.

The mounting of the reel on two separate pivoted supporting-arms gives a capability not only of adjusting the reel up and down and forward and backward to any extent desired, but also of adjusting it to any desired relative position of the two adjustments, as upward and forward, or downward and forward, and upward and backward, or downward and backward at the same time. For effecting all these adjustments by one means the following improved device is employed: To the lower supporting-arm, C, a lever-arm, E, is pivoted at $i$, and extends in a rearward direction far enough to be reached by the driver in his seat G, and this lever, having a handle, K, at its rear end, is the immediate means in the driver's hands for producing the adjustments. By this lever alone, of course, the arm C may be swung forward and backward. The upper arm, D, is connected with this lever E for adjustment by means of an extension, H, from its hinged end and of a connecting rod or bar, I, pivoted to the said arm at $l$ and to the lever at $m$. Thus, by the working of the lever E up or down on its pivot $i$, it raises or lowers the said extension H, and consequently lowers or raises the arm D with the reel A thereon. The effect of this combined construction is to produce any combination of adjusting movements of the reel by moving the lever E as required, since it is evident that the said lever may be simultaneously moved forward or backward and upward or downward.

To produce a greater or less adjusting movement of the upper arm, D, by a given movement of the lever E on its pivot $i$, the pivot-connection of the connecting-rod I therewith is made adjustable to different positions on the lever, as by adjusting-holes $n\ n\ n$, Fig. 3, or by equivalent means; and to adjust the position and height of the arm D and of the reel mounted thereon with a given height of the lever E the same pivot-connection is adjusted on the connecting-rod I by holes $o\ o\ o$ therein, or equivalent means.

It remains to describe a simple and complete device for retaining the lever E in any position to which it and the parts depending on its movements may be adjusted. For this purpose a simple plate, L, is employed, secured to the harvester-frame, as represented, and provided with a series of closely-located adjusting-holes, $p\ p$, comprehending the entire range of the adjustments of the lever E required, into any one of which holes a pin, which may be the extension of the pivot $m$, that connects the said lever and the connecting-rod I, as shown in the drawings, may enter. The lever moves close beside this adjusting-plate, so that the pin $m$ may spring into one of the holes $p\ p$ by the lateral elasticity given to the lever, or otherwise, and holds the lever in position; and by moving the lever aside a little the pin is withdrawn from its hole. To illustrate the capability of this perforated plate to give all the even minute adjustments desired, it will be sufficient to designate the extreme adjustments, whence all the intermediate adjustments are to be necessarily inferred. Thus, when the lever-pin $m$ is in the highest and most forward hole, $p'$, the reel is adjusted to its combined lowest and most forward position, as shown by full lines in Fig. 2; and when the pin is in the lowest and most forward hole, $p''$, the reel is adjusted to its combined highest and most forward position. In like manner, when the pin is in its rearward lowest and most forward hole, $p'''$, as shown by dotted lines in Fig. 2, the reel is adjusted to its combined highest and most backward position, and when the pin is in the lowest and most backward hole, $p''''$, the reel is adjusted to its combined lowest and most backward position; but it is necessary to observe that neither the absolute highest or lowest nor the most forward or most backward position is implied in the combined adjustments indicated.

It is to be observed that this adjustment-retaining plate L may be used in connection with other means to effect the adjustments of the reel besides the device herein described, it being capable of performing a similar function in connection with very various constructions and devices for the purpose; and I do not confine myself strictly to perforations in the plate. Any equivalent means of coupling the lever to the plate at numerous points may be employed.

What I claim as my invention, and desire to secure by Letters Patent, is—

1. The combination of the reel A, arms C D, lever E, and connecting-bar I, whereby the hinged movements of the two arms are simultaneously controlled by moving the said lever, substantially as and for the purpose herein specified.

2. The combination of the reel A, arm C, arm D, provided with an extension, H, the lever E, and connecting-bar I, adjustably connected with the said lever, substantially as and for the purpose herein specified.

3. The perforated adjusting-plate L, in combination with the lever E, reel A, and reel-arms C D, or their equivalents, substantially as and for the purpose herein specified.

JOHN F. APPLEBY.

Witnesses:
A. A. HOSMER,
J. S. BROWN.